United States Patent

Paull

[15] 3,656,112

[45] Apr. 11, 1972

[54] UTILITY METER REMOTE AUTOMATIC READING SYSTEM

[72] Inventor: Stephen Paull, Falls Church, Va.

[73] Assignee: Constellation Science and Technology Corporation, Oxon Hill, Md.

[22] Filed: Mar. 14, 1969

[21] Appl. No.: 807,339

[52] U.S. Cl. ................................340/151, 340/310, 325/14

[51] Int. Cl. ........................................................H04q 9/02

[58] Field of Search ................................340/151–153, 310, 340/171, 347; 179/2; 325/14

[56] References Cited

UNITED STATES PATENTS

| | | | |
|---|---|---|---|
| 2,298,435 | 10/1942 | Tunick | 325/14 |
| 3,072,894 | 1/1963 | Chapin | 179/2 |
| 3,253,260 | 5/1966 | Hawley | 340/151 |
| 3,312,812 | 4/1967 | Schmitt | 179/2 |
| 3,313,160 | 4/1967 | Goldman | 340/151 |
| 3,320,591 | 5/1967 | Mix | 340/151 |
| 3,336,577 | 8/1967 | Frielinghaus | 340/151 |
| 3,445,814 | 5/1969 | Spälti | 340/151 |
| 3,519,994 | 7/1970 | Morton | 340/347 |

*Primary Examiner*—John W. Caldwell
*Assistant Examiner*—Howard S. Cohen
*Attorney*—Sughrue, Rothwell, Mion, Zinn & Macpeak

[57] ABSTRACT

A digital data processing and communications system for a remote utility meter data acquisition system is disclosed. The system employs an electronic interrogator which may be either mobile or fixed. The interrogator transmits an encoded interrogation message to a designated fixed reply station associated with a utility meter. Upon receipt of a properly authenticated interrogation, the reply station transmits the utility meter reading back to the interrogator. The system is so designed that when more than one reply station is within range of the interrogation message, only the one reply station that is addressed in the interrogation message will transmit a reply. Thus, an interrogating operation may be carried out in which many reply stations are interrogated in successive order, with each station transmitting its reply in turn. Transmission between the interrogation station and the various reply stations may be via radio link, acoustic link, electric power line, or a combination thereof.

32 Claims, 18 Drawing Figures

INVENTOR
STEPHEN PAULL
BY
Sughrue, Rothwell, Mion, Zinn & Macpeak
ATTORNEYS

UTILITY METER REMOTE AUTOMATIC READING SYSTEM

BACKGROUND OF THE INVENTION

1. Field of the Invention

This invention relates generally to utility meter reading systems, and more particularly to a system which enables the remote acquisition, processing, display and recording of a utility meter reading or other data.

2. Description of the Prior Art

Previous methods required a human being to gain physical access to the meter and to manually transcribe the reading. With the aid of an adaptor to a meter, certain techniques have previously made use of telephone lines. Not all meters have sufficiently direct access to telephone lines, however, and the use of telephone facilities entails a continuing expense.

SUMMARY OF THE INVENTION

It is therefore an object of this invention to provide a remote automatic utility meter reading system which overcomes the aforementioned and other disadvantages and limitations.

It is another object of this invention to provide a utility meter reading system which enables a data transfer or telemetering to occur rapidly and systematically, by automatic means.

It is a further object of this invention to provide a remote utility meter reading system which employs either a mobile or stationary interrogator that is adapted to interrogate a plurality of fixed reply stations in successive order with each reply station transmitting its reply in turn.

According to the present invention the foregoing and other objects are attained by providing within a utility meter reading system an electronic interrogator which transmits an encoded interrogation message to a designated one of a plurality of fixed reply stations which are installed with respective utility meters. Upon receipt of an interrogation message containing the proper identification number or address of the utility meter, the reply station transmits the meter reading back to the interrogator. If the interrogation message does not contain the proper identification number, the reply station does not respond to the interrogation. Thus, when more than one reply station receives the same interrogation transmission, only the one station that is addressed by the interrogator will transmit a reply. This permits an interrogation operation to be carried out over a multi-station communication link with the assurance that one and only one reply station will respond to each interrogation message transmitted by the interrogator, and the identity of the reply station will be known to the interrogator.

The system according to the invention transmits interrogations and replies by an appropriate combination of several modes of communication, namely, by radio, acoustic, and/or power-line transmission of information. In the case of power-line communication, the system employs a wireless link to by-pass each transformed in the transmission path in order to transmit from one side of the other side of each transformer in the path. The actual configuration of the combination of the various modes of communication would depend on the application of the system to the specific utility system involved.

The interrogator may be either fixed or mobile. If it is mobile, it may be adapted to be driven down a street having customers whose utility meters are to be read. The interrogation transmission and reply transmission in this case may be a direct radio link or a direct acoustic link. It may be that because of the placement of the customer's utility meter, a direct radio or acoustic communication is not practical. In this case, a combination of power-line and radio or acoustic transmission would be used. For example, transmission would be via power-line to the customer's side of the transformer on the utility pole adjacent to the street and from there by way of radio or acoustic transceiver to and from the mobile interrogator. If the interrogator is fixed, it may be located at the utility substation in which case transmission between the interrogator and various reply stations would be by way of power-line. Under these circumstances, it is necessary to provide suitable by-passes around transformers and other obstructions in the transmission path. There by-passes may be radio, acoustic or any other appropriate type of by-pass.

The invention comprises two principal embodiments of the reply stations. In one embodiment, the reply station employs an accumulating memory which counts pulses generated by the rotation of a shaft in the utility meter. The count thus accumulated is proportional to the number of units consumed by the customer. In the other embodiment, the mechanical counter already existing in the utility meter is employed. In this case, the dial settings of the utility meter are read by the reply station and encoded for transmission upon interrogation.

BRIEF DESCRIPTION OF THE DRAWINGS

The specific nature of the invention, as well as other objects, aspects, uses and advantages thereof, will clearly appear from the following description and from the accompanying drawings, in which.

DETAILED DESCRIPTION OF THE INVENTION

Figure 1:
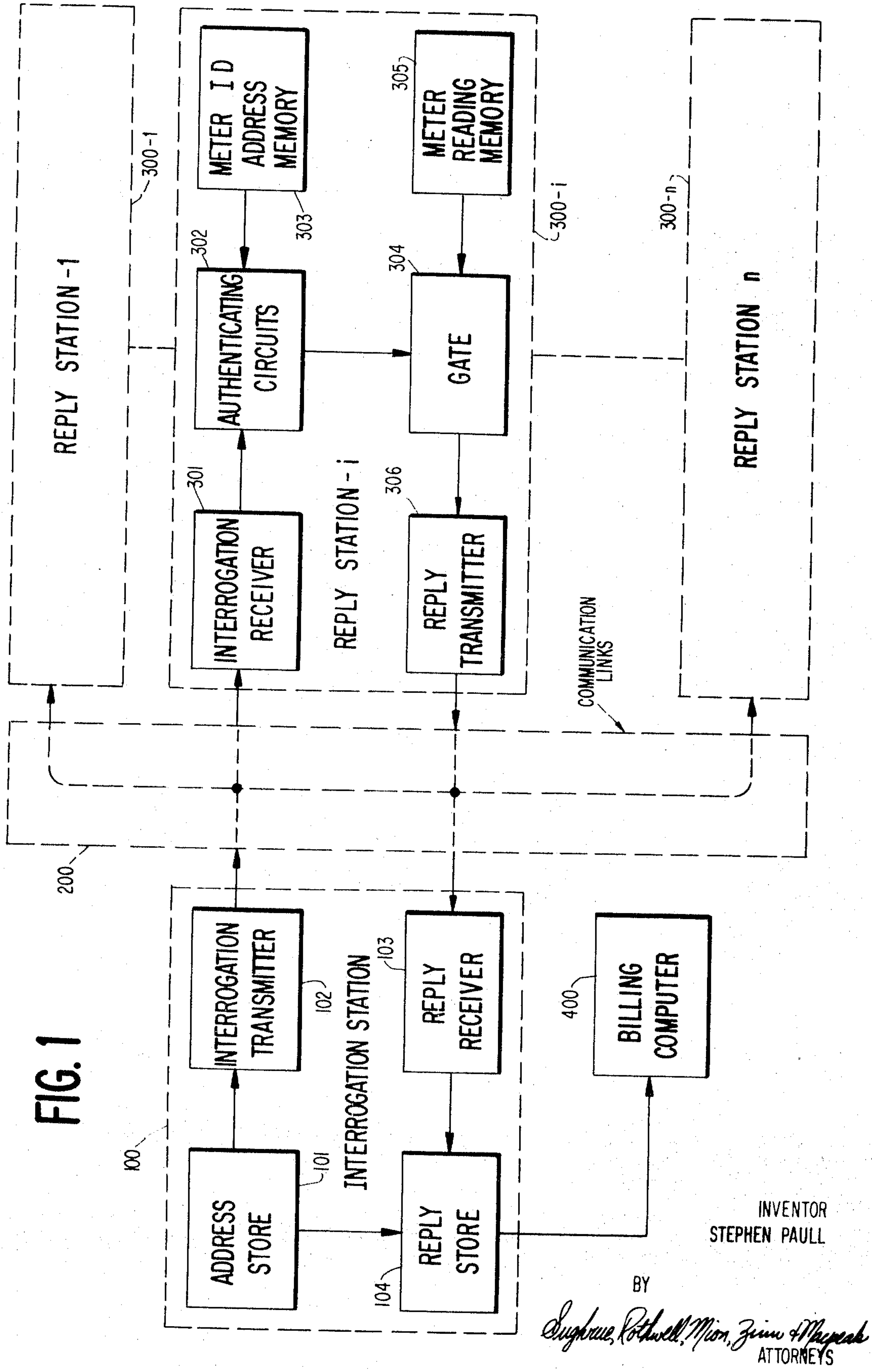
FIG. 1 is a block diagram showing the interrogation station, communication links, and a plurality of reply stations.

Now referring to the drawings wherein like reference numerals designate identical or corresponding parts throughout the several views, and more particularly to FIG. 1 thereof, the meter reading system according to the invention comprises an interrogation station 100, communication links 200, and a plurality of reply stations 300–1 through **300–*n*. The interrogation station comprises an address store 101 which stores the encoded addresses for all of the reply stations to be interrogated. Under the command of the address store, the interrogation transmitter 102 transmits an interrogating message. The interrogation message is carried by way of the communication links 200 to the several reply stations 300–1** through *n*. For purposes of illustration, it is assumed that the ith reply station is the one that is addressed. This is illustrated at 300–*i*. The reply station includes an interrogation receiver 301 which receives the interrogation message and provides the encoded address to the authenticating circuits 302. The encoded address is compared in authenticating circuits 302 with the meter identification address which is permanently stored in memory 303. If the encoded interrogation address matches the meter identification address, the authenticating circuits 302 open gate 304. This permits the meter reading stored in memory 305 to be transmitted by the reply transmitter 306. The transmission is by way of the same communication links 200 to the interrogation station 100. The reply receiver 103 receives the reply transmission and supplies the encoded meter reading to the reply store 104. Here the encoded reply transmission is identified with the meter address from address store 101. If the interrogation station is mobile, the reply store 101 would store a plurality of meter readings for later readout to the billing computer 400 at the central office. If, on the other hand, the interrogation station is fixed, the reply store 104 would act as a buffer input to the billing computer 400.

The communication links 200 may employ several modes of communication. For example, if the interrogation station is mobile, then direct radio or acoustic transmission may be employed. This may, however, be impractical due to the placement of the utility meter to be interrogated or obstructions between the reply station and the interrogating station. Under these circumstances, a combination of powerline and radio or acoustic link is used. In this case, a radio or acoustic transceiver would be mounted on the utility pole and coupled to the customer side of the transformer. The transceiver would receive a radio or acoustic interrogation transmission and couple this transmission to the power line. From there the transmission would be received by the reply station. If the interrogation is a proper one, the reply station would transmit its reply over the power line to the transceiver. The transceiver would then relay the reply station transmission to the interrogation station.

Figure 2:
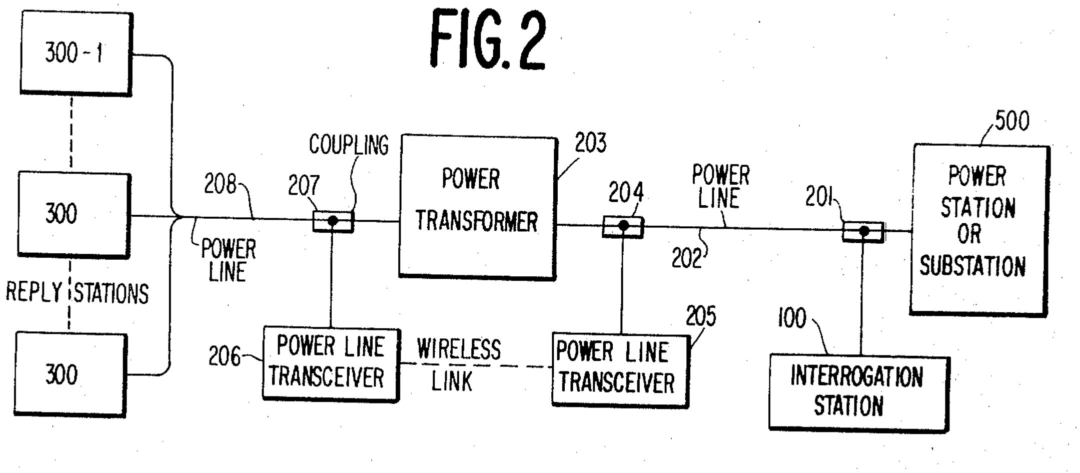
FIG. 2 is an illustration of a power line communication link with wireless by-pass.

A power line communication link for a fixed interrogating station is shown in FIG. 2. The interrogating station 100 would be physically located at a power station or substation 500. The interrogating station 100 would be coupled by way of a suitable coupling 201 to the power line 202. A power transformer 203 or other obstruction in the power line 202 requires a bypass. This is accomplished by a suitable coupling 204 which couples the data transmission on power line 202 to a transceiver 205. Transceiver 205 communicates with a second transceiver 206. Both of the transceivers 205 and 206 may be either radio or acoustic. Transceiver 206 is coupled via a suitable coupling 207 to the power line 208 on the other side of power transformer 203. The data transmission is then carried by the power line 208 to the several reply stations 300–1 through 300–*n*. The reply transmission by the addressed reply station is over the same path as the interrogation transmission, i.e., the power line 208, coupling 207, transceiver 206 to transceiver 205, the coupling 204, the power-line 202, to the coupling 201, and finally to the interrogation station 100. Obviously, the by-pass around the power transformer 203 may be by other suitable means.

The interrogation transmission to the several fixed reply stations consists of a pulse frequency modulation transmission. A pulse frequency modulated signal consists of AC pulses where the AC frequency of each pulse is one of a group of signal frequencies. A pulse frequency modulated transmission over a radio link consists of modulated RF carrier pulses, where the modulating frequency in each pulse is one of a plurality of signal frequencies. Thus, the interrogation transmitter 102 may be a type of FSK transmitter which operates under the control of the address store 101. The address store 101 would store the addresses of all the reply stations to be interrogated by means of magnetic cards or magnetic tape or other suitable means.

There are three signal frequencies used in the interrogation transmission: $f_p$ which is the preset signal, $f_0$ which is the data signal to indicate a binary 0, and $f_1$ which is the data signal to indicate a binary 1. The preset signal can alternatively consist of the simultaneous transmission of pulses at the two data frequencies. The interrogation message format is shown in the upper portion of FIG. 3. One or more preset pulses trigger an arming latch in the reply station authenticating circuits 302 and initiate the identification and verification operation. Following the preset pulses are n data pulses to form the identification number of the reply station to be interrogated. Each information bit of an incoming interrogation message is compared with the corresponding bit of the binary identification number which is stored in the fixed meter identification address memory 303 of the reply station. Memory 303 may be any suitable non-volatile read-only memory. If any one of the received bits has a different value from the corresponding stored bit, the arming latch turns off, and no reply is transmitted. If all received bits agree with their respective stored bits, the arming latch remains on and the gate 304 is opened to start the reply transmission operation.

Matched filters are used in the interrogation receiver 301 to decode the interrogation transmission. These filters are tuned to the three signal frequencies used in the interrogation. Receiver 301 therefore provides three outputs as follows: a preset output on which a pulse occurs whenever a received interrogation pulse is modulated at frequency $f_p$. A binary 0 output on which a pulse occurs whenever a received interrogation pulse is modulated at frequency $f_0$. A binary 1 output on which a pulse occurs whenever a received interrogation pulse is modulated at frequency $f_1$.

Figures 3, 5:
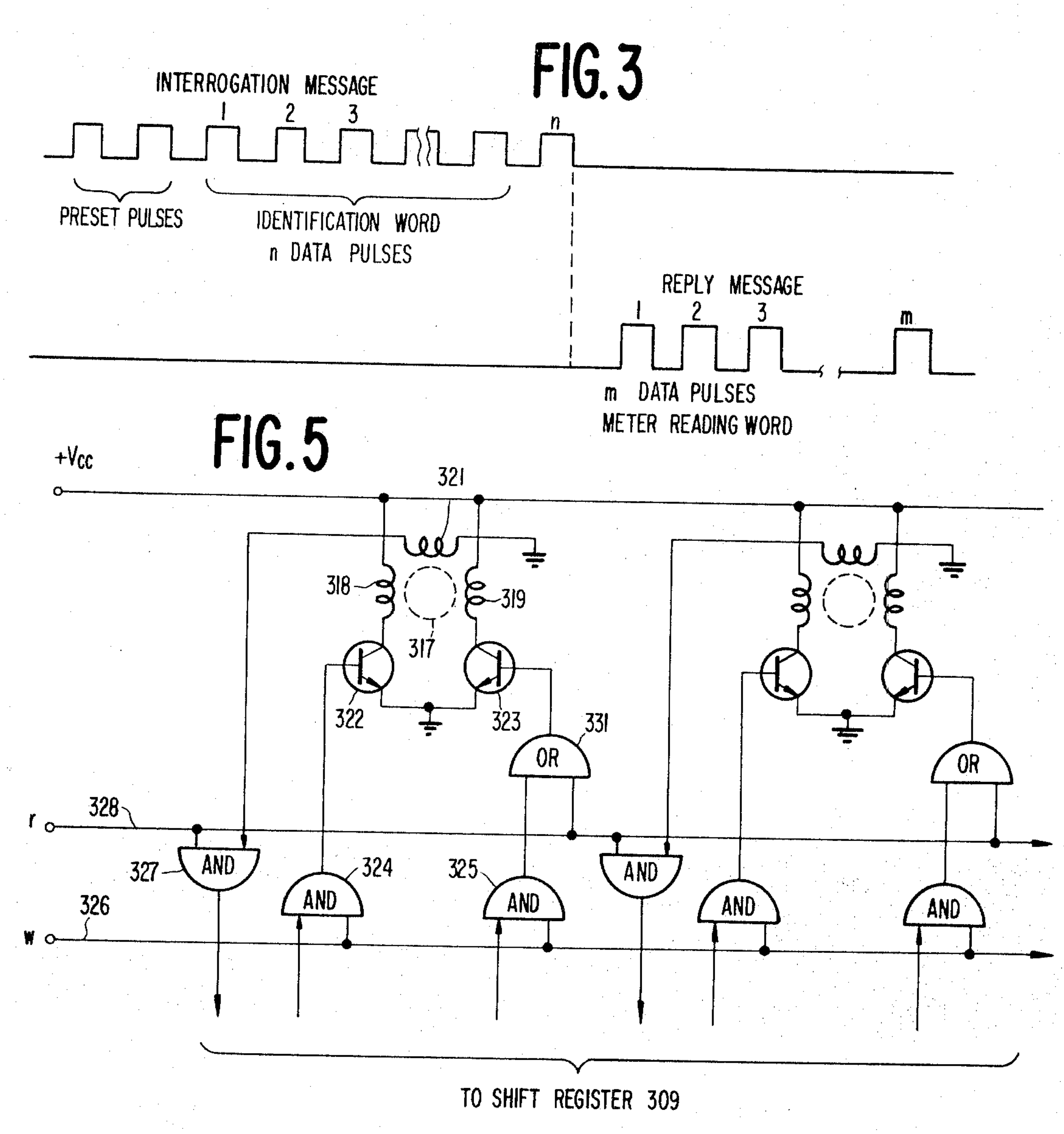
FIG. 3 is a timing diagram showing the interrogation and reply transmission formats.
FIG. 5 is a circuit diagram of the magnetic core memory for the reply station shown in FIG. 4.

A reply transmitter 306 transmits m modulated pulses for each reply transmission. The reply message may be a binary number of *m* bits, or a binary-coded decimal number with *m*/4 decimal digits. The lower portion of FIG. 3 shows the timing diagram of the reply transmission in relation to the interrogation transmission. Signal frequencies in the reply transmission are two distinct modulating frequencies, one frequency denoting binary ZERO and the other frequency denoting binary ONE.

Figure 4:
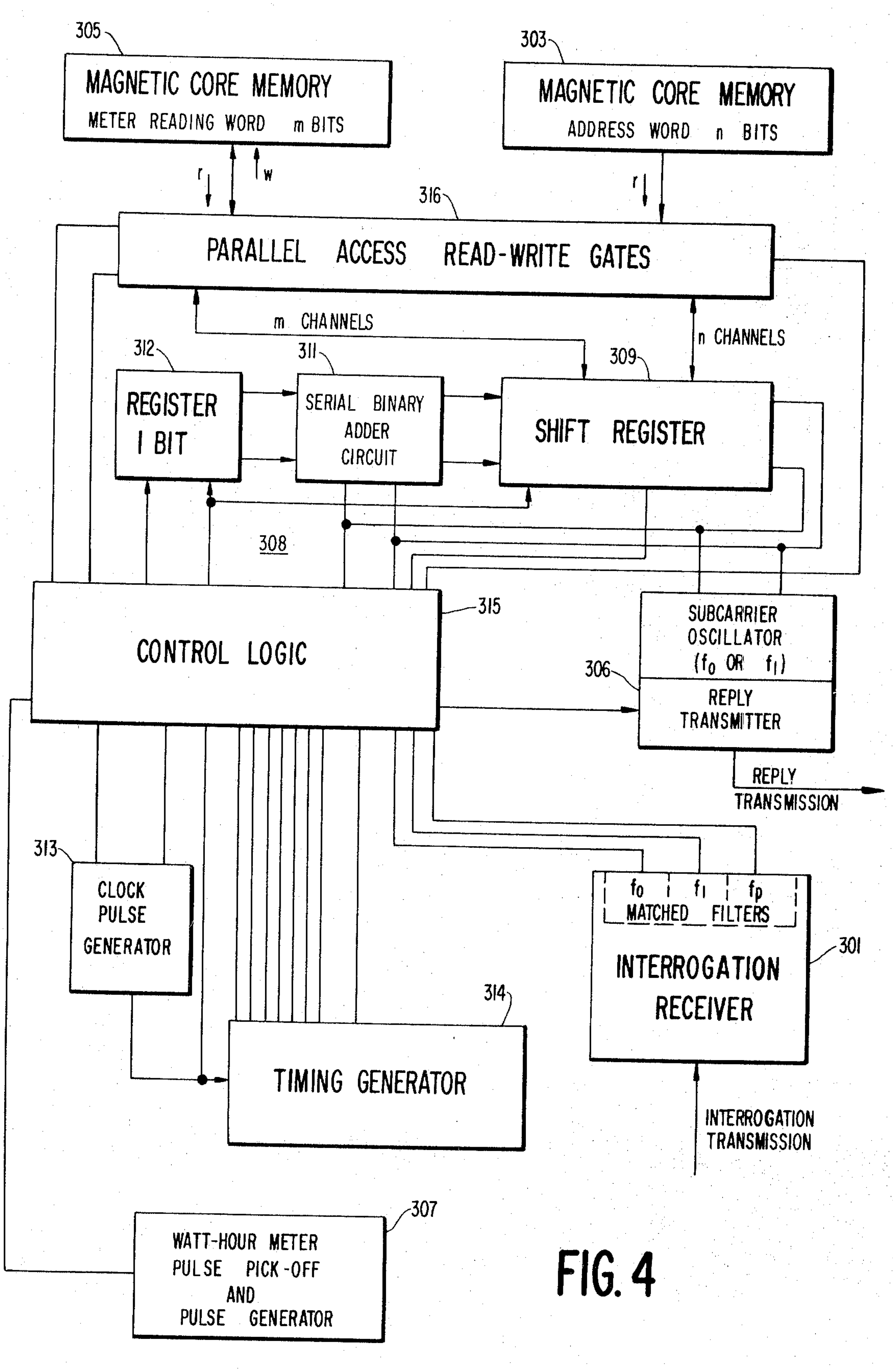
FIG. 4 is a detailed block diagram of a reply station with an accumulator memory employing a serial adder.

FIG. 4 shows in greater detail the major system components for a reply station with an accumulator memory employing a serial adder. These are the following: (1) A pulse generator 307 on a utility meter which produces one pulse every time a fixed quantity of electrical energy or other utility commodity is consumed. The total number of pulses produced in a given period of time is proportional to the total meter measurement during that period. (2) A non-destructive and non-volatile data memory 305 to store the accumulated count of pulses from the pulse generator 307. (3) A permanent address memory 303 which stores the assigned reply station identification number. (4) An interrogation receiver 301. (5) A reply transmitter with pulse frequency modulation subcarrier modulating oscillator 306. (6) Special-purpose digital computer circuitry generally indicated at 308 to continuously up-date the meter reading information in the memory, and to transfer this information from the memory to the reply transmitter whenever a properly addressed interrogation is received.

The operation of the system is controlled by the special-purpose digital computer circuitry 308. This includes a shift register 309 which has parallel access to the data memory 305 and to the address memory 303. A serial binary adder 311 is connected to the serial input to the shift register 309. A preset one bit input is supplied to the adder 311 by register 312. A clock pulse generator 313 and a timing generator 314, which preferably is a synchronous counter, provides the timing signals for the computer circuits and the reply station. The control logic 315 interconnects the shift register 309, binary adder 311 and the clock pulse and timing generators 313 and 314 to perform two different programs.

The first program is to add one to the contents of the data memory 305. The computer circuits execute this program each time a trigger pulse is received from the pulse generator 307. This program consists of three major parts. In the first part, the contents of the meter reading memory 305 are transferred into the shift register 309 by way of the parallel access read-write gates 316. The contents of shift register 309 are then circulated through the binary adder 311 under the control of the control logic circuits 315. This adds the contents of the one bit register 312 to the number in the shift register 309. Thus, the new number and shift register 309 exceeds the original number by one reflecting the consumption of electrical energy indicated by the pulse output from pulse generator 307. During the final part of the program, the new number in shift register 309 is transferred back into the meter memory 305.

The second program executed by the computer circuits is to verify an address contained in the incoming interrogation message. If the interrogation message contains the correct address for the reply station, the contents of the meter memory 305 are transferred to the reply transmitter 306 to transmit a reply message. If the interrogation message does not contain the correct address, no reply message is transmitted. The computer circuits execute this program each time an interrogation message is received. The program begins when the interrogation preset pulse turns on the arming latch in the computer control logic 315. When this happens, the contents of the permanent address memory 303 are transferred in parallel via gates 316 to the shift register 309. Each received data bit in the interrogation message is compared with the corresponding bit of the address word in shift register 309. If at least one received bit disagrees with the stored bit, the arming latch is turned off and the program ends. If all received interrogation bits agree with corresponding bits in the shift register 309, the arming latch remains on and the program continues. The control logic circuit 315 turns on the reply transmitter 306 at the end of the interrogation transmission. The local clock generator 313 pulses the reply transmitter 306 to transmit a data word of *m* bits, where *m* is the length of the meter reading binary word. This is accomplished by transferring the contents of the meter memory 305 in parallel via gates 316 to shift register 309. The contents of the shift register 309 are then shifted into the transmitter subcarrier oscillator with each clock pulse. Each bit in shift register 309 modulates one of the transmitted reply pulses. A binary one is transmitted as pulse modulation frequency $f_1$, and the binary 0 is transmitted as pulse modulation frequency $f_0$. Finally the computer control logic circuit 315 turns off the reply transmitter 306 after *m* reply pulses have been transmitted.

An automatic clocked fail-safe operation is provided to turn off the arming latch in the control logic 315 in case of a failure in the interrogation transmission following the receipt of the preset pulse. This assures that the arming latch does not remain on indefinitely after an incomplete or faulty interrogation transmission.

FIG. 5 shows two stages of an m-stage magnetic core memory which may be used for the meter reading memory 305. This memory stores the utility meter reading as a binary number with m bits. The magnetic cores are of square-loop magnetic material such as, for example, ferrite. Each of the magnetic cores 317 has three windings: a "write one" winding 318, a "write zero" winding 319, and a "read" winding 321. The "write" windings 318 and 319 are connected between a source of positive potential plus $V_{CC}$ and the collectors of respective NPN transistors 322 and 323. The emitters of transistors 322 and 323 are both connected to ground potential. A binary number is placed in the memory by means of "-write" gates 324 and 325 which transfer the information bits into the memory from corresponding stages of the shift register 309. Thus, if a stage of shift register 309 contains a binary 1, the corresponding "write gate" 324 will be opened to pass a "write" pulse on line 326 to the base of transistor 322. This causes transistor 322 to conduct causing a current to flow in "write one" winding 318 and thereby storing a binary 1 in the magnetic core 317. A similar operation takes place in the case of a binary zero except that "write gate" 325 is open to pass the "write" pulse on line 326 to the base of transistor 323.

The binary number in the memory 305 is read into the shift register 309 by means of the "read" 327. The "read" action consists of two steps. During the first step, the "read" pulse on line 328 is applied to all of the OR gates 331. This switches all the cores 317 in the binary 1 position to the binary 0 position and produces an output pulse on "read" winding 321. The output pulse from winding 321 is applied to the corresponding stage of shift register 309. A "write" pulse immediately following the "read" pulse transfers the binary 1 back into the core 317. Thus, the read-write action transfers the memory contents into the shift register 309 and at the same time preserves the information content of the memory 305. A reset to binary 0 pulse must be applied to each stage of the shift register 309 before the read-write process takes place.

Figure 6:
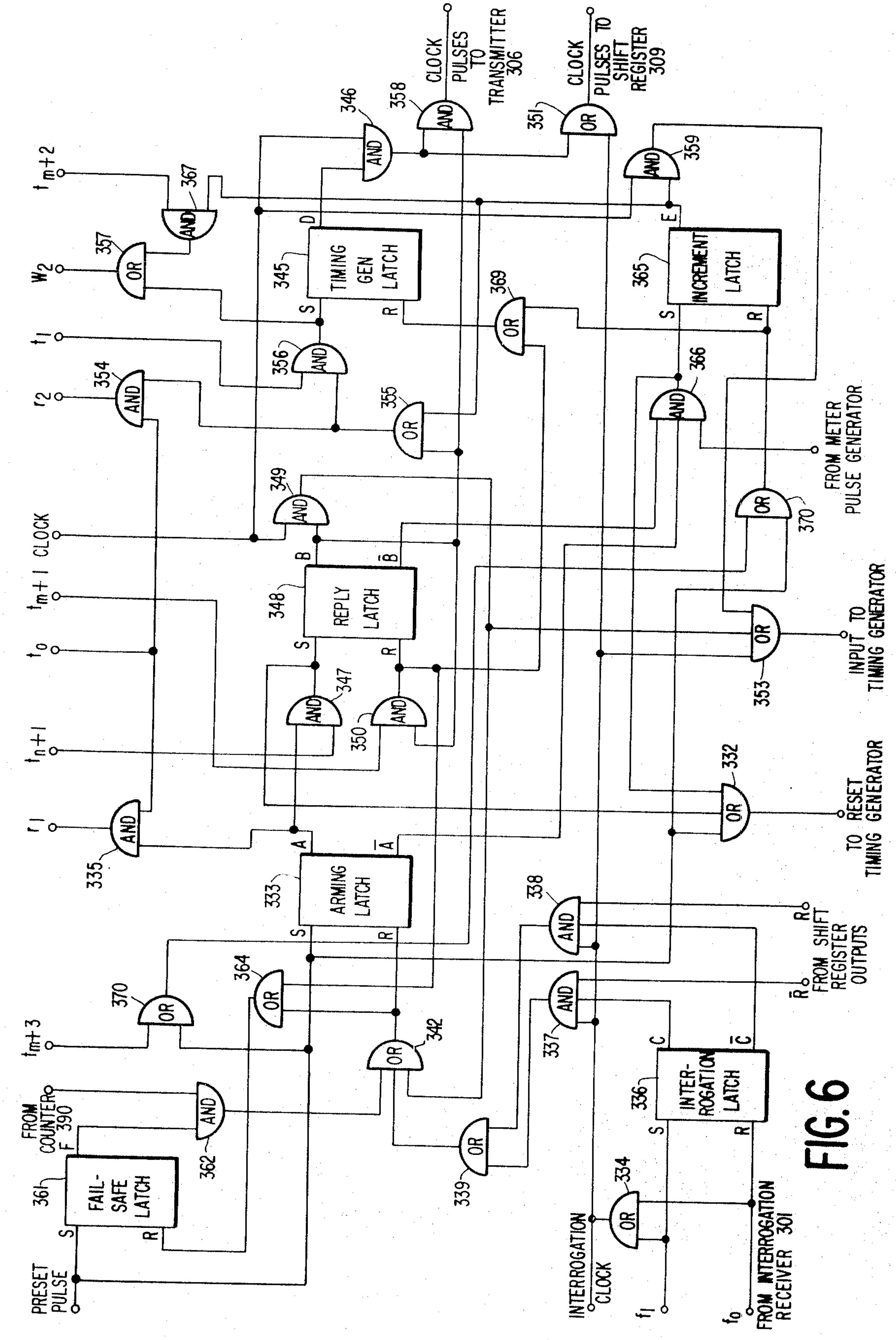
FIG. 6 is the control logic diagram for the reply station shown in FIG. 4.

FIG. 6 illustrates the control logic used in the reply station shown in FIG. 4. The logic shown in FIG. 6 will first be described with respect to the interrogation reply sequence. Upon receipt of a preset pulse, the timing generator 314 is reset through OR gate 332 and the arming latch 333 is set. The interrogation clock is obtained from the reply receiver 301 by combining the outputs $f_1$ and $f_0$ in OR gate 334. The timing generator 314 begins counting under the control of the interrogation clock to provide the various timing pulses required for the operation of the system. The output of the arming latch 333 also enables the AND gate 335. The other input of AND gate 335 is connected to the $t_0$ output of timing generator 314. This produces a read pulse which causes the contents of memory 303 to be read into the shift register 309. The outputs $f_1$ and $f_0$ from the receiver 301 are also connected to respective inputs of the interrogation latch 336. The interrogation latch 336 follows the outputs $f_1$ and $f_0$ to provide inputs to the verification AND gates 337 and 338. The verification AND gates 337, 338 are clocked by the interrogation clock which is obtained from the output of OR gate 334. The AND gates 337 and 338 also receive the output and complementary output from the shift register 309. As the contents of shift register 309 are shifted out bit by bit, the verification AND gates 337 and 338 compare the outputs of the shift register 309 with the outputs from the interrogation latch 336. The outputs of AND gates 337 and 338 are combined in an OR gate 339. If any bit in the shift register does not agree with the output from the interrogation latch 336, an output will be transmitted through OR gate 339 and OR gate 342 to reset the arming latch 333 thereby stopping the operation of the system.

Arming latch 333 also enables an AND gate 347. If the interrogation is a valid interrogation, the AND gate 347 will at time $t_{n+1}$ produce an output which will set the reply latch 348. The output of AND gate 347 is also passed by OR gate 332 to reset the timing generator 314. The reply latch 348 enables an AND gate 349. The other input of AND gate 349 is connected to the internal clock pulse generator. The output of AND gate 349 is connected by way of OR gate 342 to reset the arming latch 333. The output of AND gate 349 is fed through OR gate 353 to the input of the timing generator. The interrogation clock is also fed through OR gate 353 to the input of the timing generator. The timing generator thereby counts clock pulses from the interrogation clock during the time an interrogation message is being received, and counts clock pulses from the internal clock pulse generator during the time a reply is being transmitted. The reply latch 348 also enables AND gate 354 through OR gate 355. At time $t_0$ AND gate 354 generates the "read" pulse on line 328 which causes the contents of memory 305 to be read into shift register 309. Immediately thereafter, at time $t_1$, the contents of memory 305 are restored as explained with reference to FIG. 5. This is accomplished through AND gate 356 which is enabled by the output of the reply latch 348. AND gate 356 has its second input connected to the timing pulse $t_1$ from the timing generator 314. The output of AND gate 356 coupled through OR gate 357 is the "-write" pulse on line 326 which is applied to the memory 305 to restore its contents after the "read" operation.

The output of AND gate 356 at time $t_1$ turns the timing generator latch 345 on. The timing generator latch 345 enables an AND gate 346. The other input to AND gate 346 is connected to the internal clock pulse generator. The gated clock pulses obtained from the output of AND gate 346 are applied to the reply transmitter during the reply action through the operation of AND gate 358. The other input to AND gate 358 is connected to the output of the reply latch 348. The output from AND gate 346 is also connected to the shift register clock pulse line through OR gate 351.

The output of the reply latch 348 enables an AND gate 350. The other input to AND gate 350 is connected to the timing generator output $t_{m+1}$. The reply latch is thereby reset at time $t_{m+1}$. The timing generator output $t_{m+1}$ is also connected to the reset terminal of timing generator latch 345 through AND gate 350 and OR gate 369. Timing generator latch 345 is thereby also reset at time $t_{m+1}$.

Once the contents of memory 305 have been read into shift register 309, the contents of the shift register are sequentially shifted out to the transmitter 306 which is under the control of the clock pulses from the output of AND gate 346 fed through AND gate 358. AND gate 358 is enabled by the reply latch 348. The other input to AND gate 358 is obtained from the output of AND gate 346. Once the *m*-bit data word has been shifted out to the transmitter 306, the reply latch 348 is reset by the output from AND gate 350. AND gate 350 is enabled by the output from reply latch 348 and has as its second input the timing pulse $t_{m+1}$ from the timing generator 314. This completes the interrogation reply cycle of the control logic for the system.

As previously mentioned, there is a fail-safe mode of operation of the control logic. To accomplish the fail-safe function, there is provided a fail-safe latch 361. The fail-safe latch 361 is set by the preset pulse at the same time that the arming latch 333 is set. If for some reason the interrogation is faulty or not completed, the arming latch 333 will be turned off by a pulse from a delay pulse counter 390. This pulse is obtained from AND gate 362 which is enabled by the fail-safe latch 361. The output of AND gate 362 is connected through the OR gate 342 to the reset side of arming latch 333. The fail-safe latch 361 is itself reset whenever the arming latch 333 or the reply latch 348 receives a normal reset pulse. This is accomplished through the action of OR gate 364.

The operation of the system when ONE is to be added to the contents of the memory 305 is initiated by the setting of the increment latch 365. This occurs when a pulse is received from the pulse generator 307 and applied to AND gate 366. The AND gate 366 is enabled by the complementary outputs from the arming latch 333 and the reply latch 348. This prevents the operation from taking place if the system is receiving an interrogation or in the middle of a reply transmission. The output of AND gate 366 also resets the timing generator 314 through OR gate 332. The output of increment latch 365 enables AND gate 359. The other input to AND gate 359 is the internal clock pulse generator. The output of AND gate 359 is a gated clock pulse output which is fed to the timing generator 314 input through OR gate 353. The output of increment latch 365 also enables AND gate 354 and AND gate 356 through OR gate 355. The other input to AND gate 354 is the timing generator output $t_0$. The output of AND gate 354 at time $t_0$ is the "read" pulse which causes the contents of the memory 305 to be read into shift register 309. The output of AND gate 356 is a pulse which occurs at time $t_1$. This pulse sets the timing generator latch 345 and also is the "write" pulse which causes the restore action in the memory 305. The "write" pulse is fed to the memory 305 through the OR gate 357. The timing generator latch 345 enables the AND gate 346. The other input to AND gate 346 is the internal clock pulse generator. The output of AND gate 346 is the gated clock pulses which are fed to the shift register 309 through OR gate 351. Once the contents of memory 305 have been gated in parallel via gates 316 to the shift register 309, the shift register is then caused to serially shift its contents into the serial binary adder 311 under the control of clock pulses provided at the output of OR gate 351.

Once the process has been completed, that is when the one bit stored in register 312 has been added to the contents of shift register 309, then the contents of the shift register 309 are read into the memory 305. This is accomplished at time $t_{m+2}$. A pulse at time $t_{m+2}$ is passed by AND gate 367 and OR gate 357 to generate another "write" pulse on line 326. During all of this time, the AND gate 356 has been enabled by the output of the increment latch 365. Increment latch 365 is turned off by a timing pulse $t_{m+3}$ from the timing generator 314 which is coupled to the increment latch reset through OR gate 370. The increment latch is also reset by the preset pulse at the beginning of the interrogation operation through OR gate 370. Thus, if an interrogation and reply action is initiated in the midst of the add ONE program of the control logic, then the increment latch will be reset and the add ONE program stopped. The reply transmission would then take place.

Figures 7, 8:
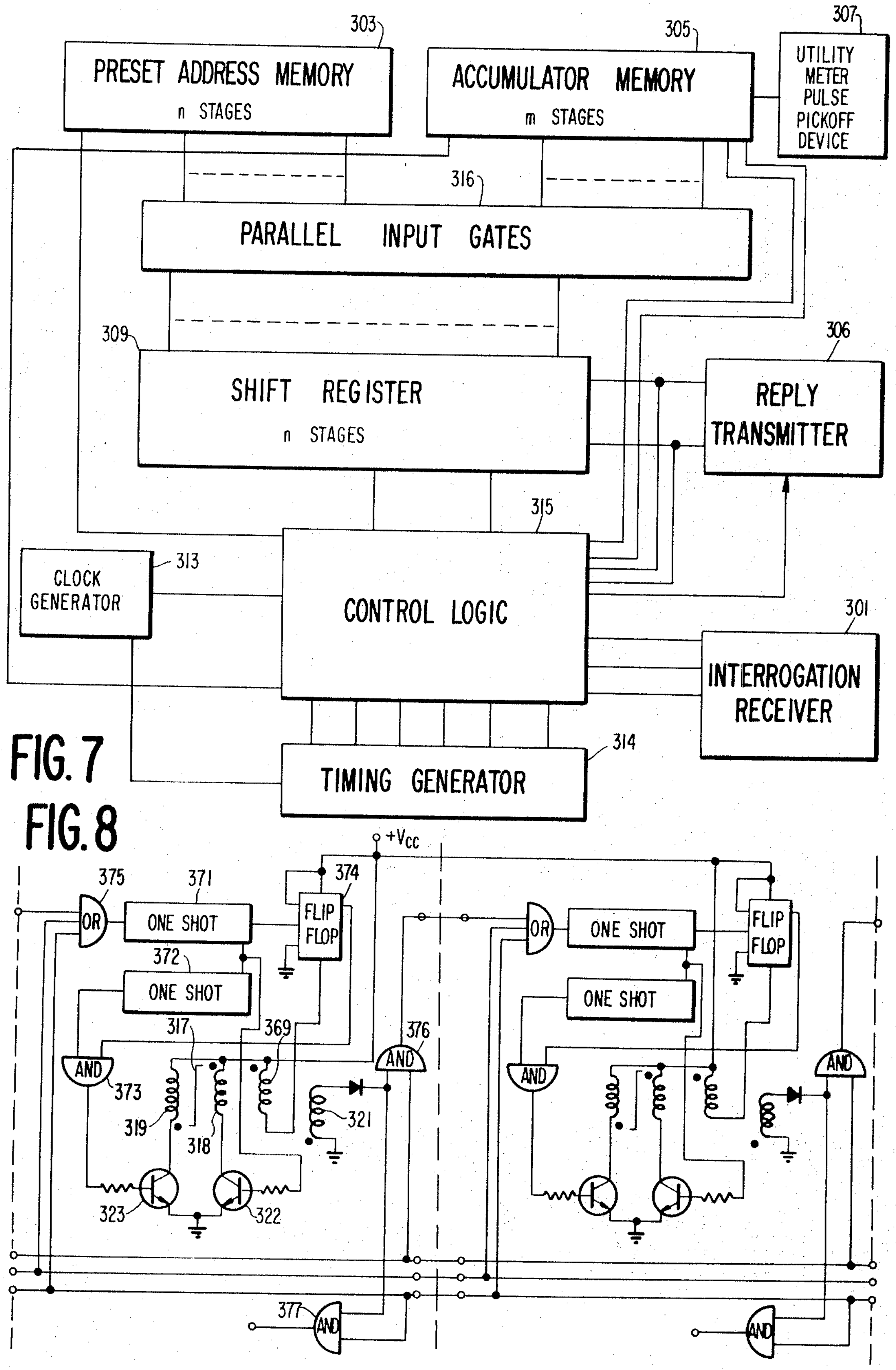
FIG. 7 is a detailed block diagram of a reply station with an accumulator memory employing a counting memory.
FIG. 8 is a circuit diagram of the counting memory for the reply station shown in FIG. 7.

FIG. 7 illustrates a reply station similar to the one shown in FIG. 4 but employing a different accumulator memory. A pulse generator 307 supplies a pulse to the input of a non-volatile magnetic core accumulator 305. The accumulator 305 is one that does not lose its stored count when a power failure occurs. Each time the generator 307 produces an output pulse, the accumulator 305 increases its stored count by one. The permanent address memory 303 stores the identification number assigned to the reply station. The shift register 309 is provided with parallel input gates 316 from memories 305 and 303. Serial shift pulses feed the contents of the shift register 309 to the interrogation verification circuits during the time an interrogation message is being received, or to the reply transmitter when the reply station is transmitting a meter reading to the interrogator. The control logic circuit 315 performs the address verification and reply operations under the control of the clock generator 313 and the timing generator 314. Again, the timing generator 314 is a counter circuit to produce the timing pulses necessary during the address verification and reply operations. As may be seen, the system shown in FIG. 7 is basically similar to that shown in FIG. 4 except that the control logic circuits are simplified since the memory 305 automatically accumulates pulses from the generator 307 without any control from the control logic circuit 315.

The accumulator memory 305 is shown in FIG. 8. This consists of an m stage magnetic core counter/accumulator with parallel readout and restore circuits. Two stages of the accumulator are shown in Figure, each stage of which includes a magnetic core 317. The core material is a square-loop material such as ferrite. Each magnetic core is provided with four windings: two "write" windings 318 and 319, a "sensing" winding 369, and a "read" winding 321. Each of the "write" windings 318 and 319 are connected to a source of positive potential plus $V_{CC}$. The other end of windings 318 and 319 are coupled to the collectors of respective NPN transistors 322 and 323. The emitters of transistors 322 and 323 are both connected to ground. A pair of monostable multivibrators or one-shot pulse generators 371 and 372 are connected in series to generate the pulses that control transistors 322 and 323. The output of one-shot 371 is connected to the base electrode of transistor 322. The output of one-shot 371 is also connected to the input of one-shot 372 which has its output connected through gate 373 to the base of transistor 323. The output of one-shot 371 is further connected to the trigger input of flip-flop 374 which in turn is connected to the other input of gate 373. "Sensing" winding 369 has one end connected to the source of positive potential plus $V_{CC}$ and the other end to the inhibit input of flip-flop 374. A three input OR gate 375 provides the input to one-shot 371. The first input to OR gate 375 is the counter input from the pulse generator 307 or the next preceding stage, as the case may be. The second input to OR gate 375 is the "write" pulse input, while the third input is the "read" pulse input.

The same core switching action takes place when the accumulator is counting meter reading pulses from generator 307 or when a parallel read-and-restore action takes place. During counting action, the input trigger pulse comes from the output of the previous stage, or from the pulse generator 307 if the first stage. During a reply action, the input trigger pulse for parallel read-out is the "read" pulse. The trigger pulse for restore action is the "write" pulse. Each input trigger initiates the one-shots 371 and 372. A pulse from one-shot 371 turns on switching transistor 322. The width of the output pulse from the one-shot 371 is adjusted so as to switch the core 317 from logic 0 to logic 1, but not from a flux value of $-B_S$ to a flux value of $+B_S$. The pulse output from one-shot 372 turns on the switching transistor 323 whenever the gate 373 is on. The width of the output pulse from one-shot 372 is adjusted so as to switch the core 317 from a flux value of $+B_S$ to $-B_S$.

Assume that the core 317 is initially at logic 0. The input pulse triggers the one-shots 371 and 372. A pulse from one-shot 371 switches core 317 from 0 to 1, and the voltage developed on winding 369 during this flux change is applied to the inhibit input on flip-flop 374. This prevents flip-flop 374 from being clocked to the condition of binary 1 by the pulse output from one-shot 371. The output pulse from one-shot 372 which follows that from one-shot 371 has no effect on transistor 323, and core 317 therefor remains magnetized in the logic 1 condition. No output pulse appears on the "read" winding 321 during the time interval of the output pulse from one-shot 372.

Now assume that the core 317 is initially at logic 1. The input pulse triggers one-shots 371 and 372, and the pulse output from one-shot 371 switches core 317 from the logic 1 to the flux value $+B_S$. This switching action is completed before the end of the time interval of the output pulse of one-shot 371, and core 317 is driven into saturation for the remainder of this pulse period. During saturation, the voltage on "-sensing" winding 369 vanishes, and thus the remaining portion of the pulse output from one-shot 371 acts as a clock pulse to flip-flop 374. Flip-flop 374 switches from 0 to 1. The output pulse from one-shot 372 turns on transistor 323 and switches the core from $+B_S$ to $-B_S$. This flux change produces an output pulse on winding 321.

When the memory 305 is operating as a counter/accumulator, the pulses from the pulse pick-off and generator 307 are fed to the counter input terminal at stage 1. Each stage of the accumulator acts as a binary counter. The output gate 376 connected to winding 321 from each stage to the next stage is enabled by the complementary output from the reply latch 348 in the control logic circuits 315. Whenever the reply latch is turned on, the counter action is inhibited.

During each reply operation, the "read" pulse initiates a readout action. Each core at logic 0 switches to logic 1 during the output pulse interval of one-shot 371, and each core at logic 1 switches to logic 0 during the output pulse interval of one-shot 372. Output pulses generated by the flux value changes from $+B_S$ to $-B_S$ of the logic 1 cores are fed through the parallel read out gates 377 to the corresponding stages of the shift register 309. Immediately following the "read" pulse is the "write" pulse. This pulse initiates another sequence of pulses from one-shots 371 and 372. This action restores all cores to their original condition. No output pulses go to the shift register 309 during the restore action because the parallel output gates 377 are not enabled during the "write" pulse.

Figure 9:
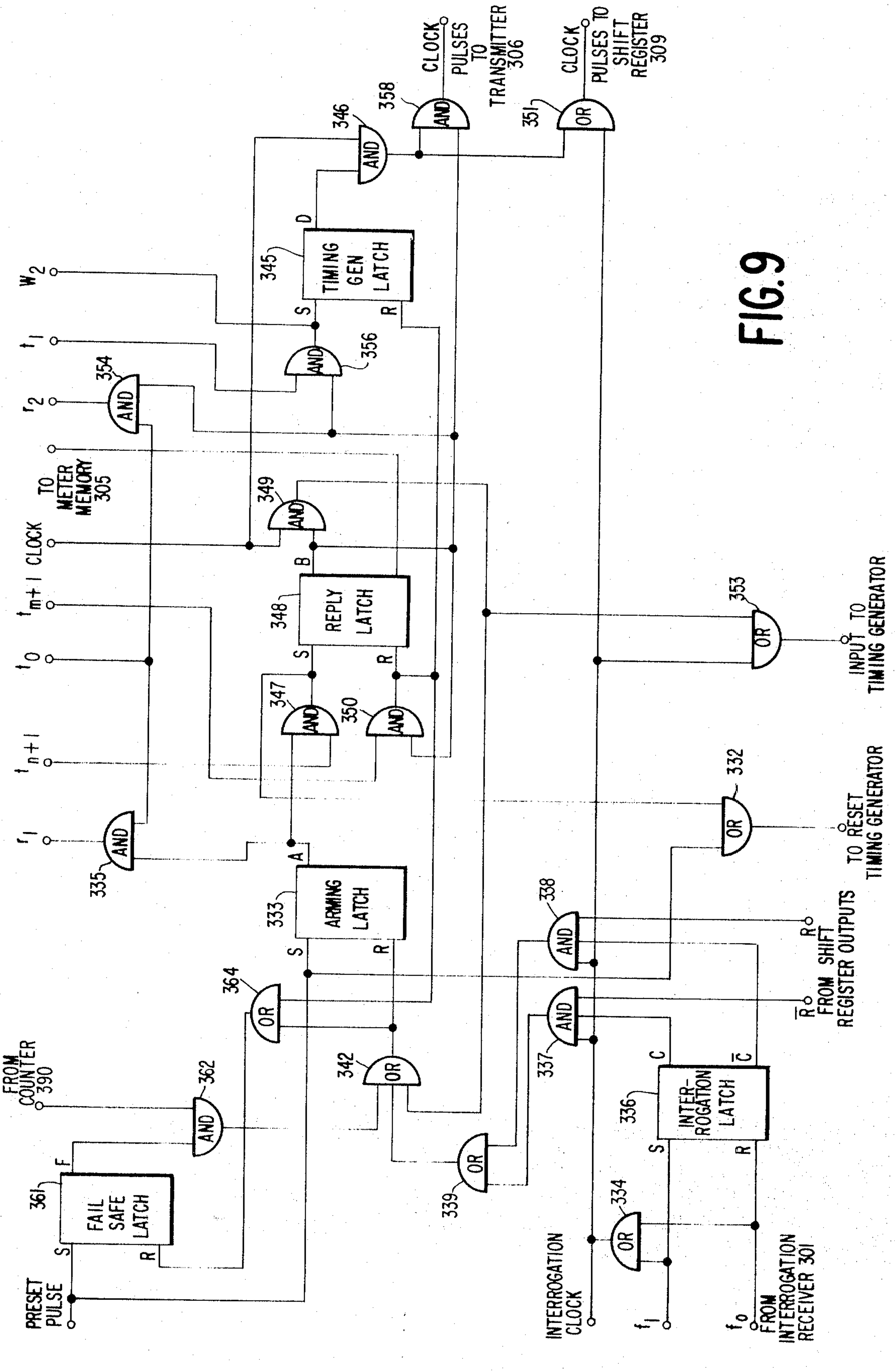
FIG. 9 is the control logic for the reply station shown in FIG. 7.

FIG. 9 shows the control logic which is used in the system of FIG. 7. As may be seen, the control logic for the system of FIG. 7 is very much like that of the control logic for the system of FIG. 4. The principle difference is that the increment latch 365 and its associated circuitry have been omitted. This is because the counting memory shown in FIG. 7 automatically performs the function for which the increment latch 365 was intended. The logic in FIG. 9 performs the same verification and reply function as did the logic in FIG. 6. The logic in FIG. 9 also includes the fail-safe latch 361 which operates in the same manner as before. There is, however, one remaining difference in the logic circuits and that is the complementary output of reply latch 348 is supplied to the memory 305. As described with respect to FIG. 8 of the drawings, this is to prevent the incrementing of the accumulator memory 305 should a reply transmission be initiated. This is analogous to the interconnection of the reply latch 348 with the increment latch 365 in FIG. 6.

Figure 10:
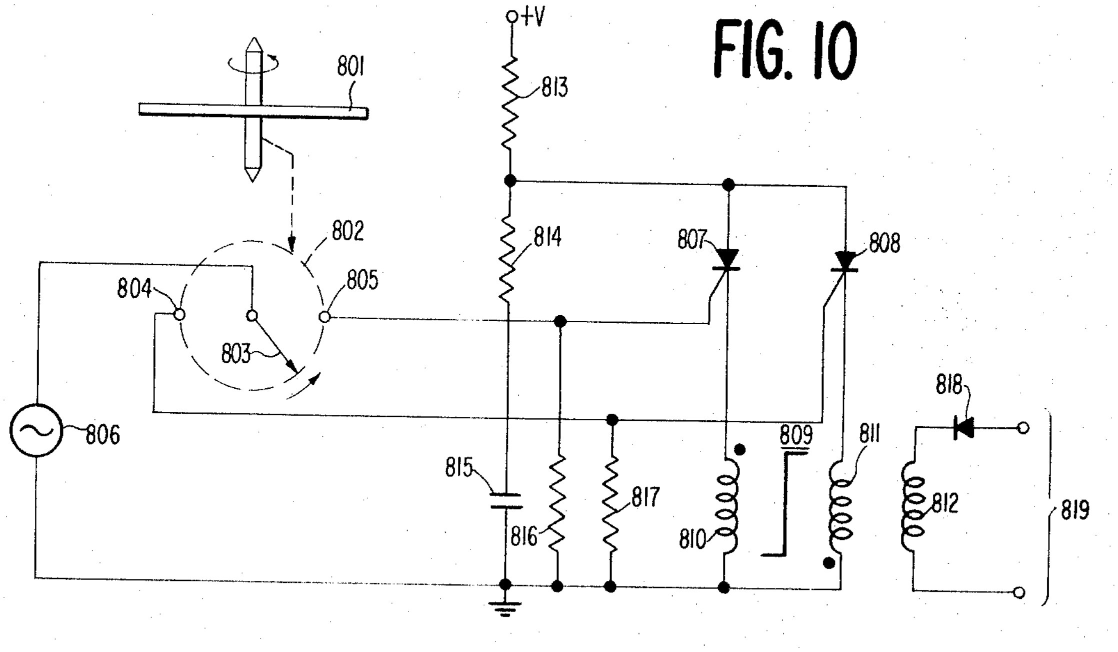
FIG. 10 illustrates a commutating shaft rotation sensor useful in the accumulator memory reply stations illustrated in FIGS. 4 and 7.

FIGS. 10, 11, 12, and 13 show different schemes for generating a fixed number of pulses for each revolution of the rotating shaft of the utility meter. In FIG. 10, the meter shaft 801 drives a commutating switch 802. Commutating switch 802 has a rotating wiper 803 which is mechanically connected to the shaft 801. During each revolution, wiper 803 contacts each of terminals 804 and 805. An AC source or a pulse generator 806 is connected to the wiper 803, while the terminals 804 and 805 are respectively connected to the gate electrodes of silicon controlled rectifiers 808 and 807. The silicon controlled rectifiers 807 and 808 are connected to a saturable core transformer 809 having windings 810, 811 and 812. Silicon controlled rectifier 807 is connected to winding 810 of transformer 809, and silicon controlled rectifier 808 is connected to winding 811. The anodes of both of the silicon controlled rectifiers 807 and 808 are connected together to a resistive voltage divider comprising resistors 813 and 814. The voltage divider 813 and 814 is connected in series between a source of positive potential plus V and a capacitor 815. Completing the circuit are resistors 816 and 817 connected across the gate electrodes of silicon controlled rectifiers 807 and 808, respectively, and a diode 818 connected to the winding 812 of transformer 809.

The operation of the circuit of FIG. 10 is as follows: When silicon controlled rectifier 807 conducts, current through winding 810 of the saturable core transformer 809 produces a positive magnetizing force. When silicon controlled rectifier 808 conducts, current through the winding 811 produces a negative magnetizing force. With the transformer core initially in the zero condition, the first trigger that turns silicon controlled rectifier 807 on switches the core of transformer 809 to one. Subsequent triggers fed to the silicon controlled rectifier 807 maintain the transformer 809 in the saturated one condition. The core remains in the one condition until the shaft of the meter moves to a position which couples triggers to silicon controlled rectifier 808. The first trigger that turns silicon controlled rectifier 808 on switches transformer 809 to the zero condition. The core of the transformer remains at zero until the shaft of the meter moves to a position which again couples triggers to the silicon controlled rectifier 807. A single output pulse is generated on the transformer winding 812 each time the core switches from zero to one. Pulses of opposite polarity on winding 812 resulting from switching from one to zero do not reach the output terminals 819 because of the isolation provided by the diode 818. The number of output pulses per shaft revolution is a function of the number of times in each revolution that the coupling alternates between the silicon controlled rectifiers 807 and 808. The total number of pulses obtained over a long period of time is proportional to the number of shaft revolutions, and is independent of the shaft angular velocity. The silicon controlled rectifier current to drive the windings in the transformer 809 is obtained from the discharge of the capacitor 815 through resistor 814. The time constant of resistor 814 and capacitor 815 determines the pulse width of the driving current through their respective windings 810 and 811. After each trigger pulse is removed, the silicon controlled rectifier turns off because resistor 813 is large enough to limit the silicon controlled rectifier to below the holding current requirement. The capacitor 815 recharges through resistor 813 and resistor 814 before the silicon controlled rectifier can again conduct. This relaxation operation is necessary so that the silicon controlled rectifier devices do not remain on after being triggered longer than is necessary to switch the transformer 809.

Figure 11:
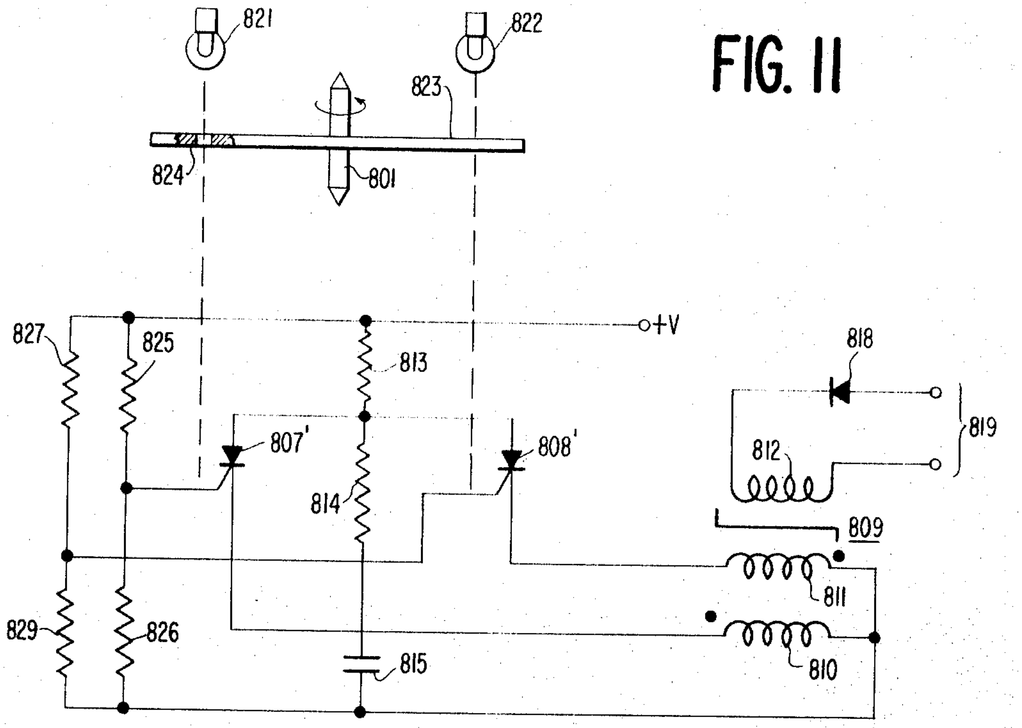
FIG. 11 illustrates a photoelectric shaft rotation sensor useful in the accumulator memory reply stations shown in FIGS. 4 and 7.

In FIG. 11, there is illustrated a photoelectric shaft rotation sensor. This comprises a pair of pulsed light sources 821 and 822. The pulsed light sources are positioned behind a rotating disc 823 attached to the rotating shaft 801. The disc 823 may be, for example, the revolving disc in a watthour meter. A hole 824 and the disc 823 alternately couples the pulsed light sources 821 and 822 to two light-sensitive semiconductor silicon switches 807′ and 808′. A resistive voltage divider comprising resistors 825 and 826 establishes the quiescent voltage level for the gate electrode of silicon switch 807′, while the resistive voltage divider 827, 829 establishes the quiescent voltage level of the gate electrode for silicon switch 808′. The remainder of the circuit is essentially the same as that shown in FIG. 10, and the operation is similar. As an alternative, incandescent light sources may be substituted for the pulsed light sources 821 and 822.

Figure 12:
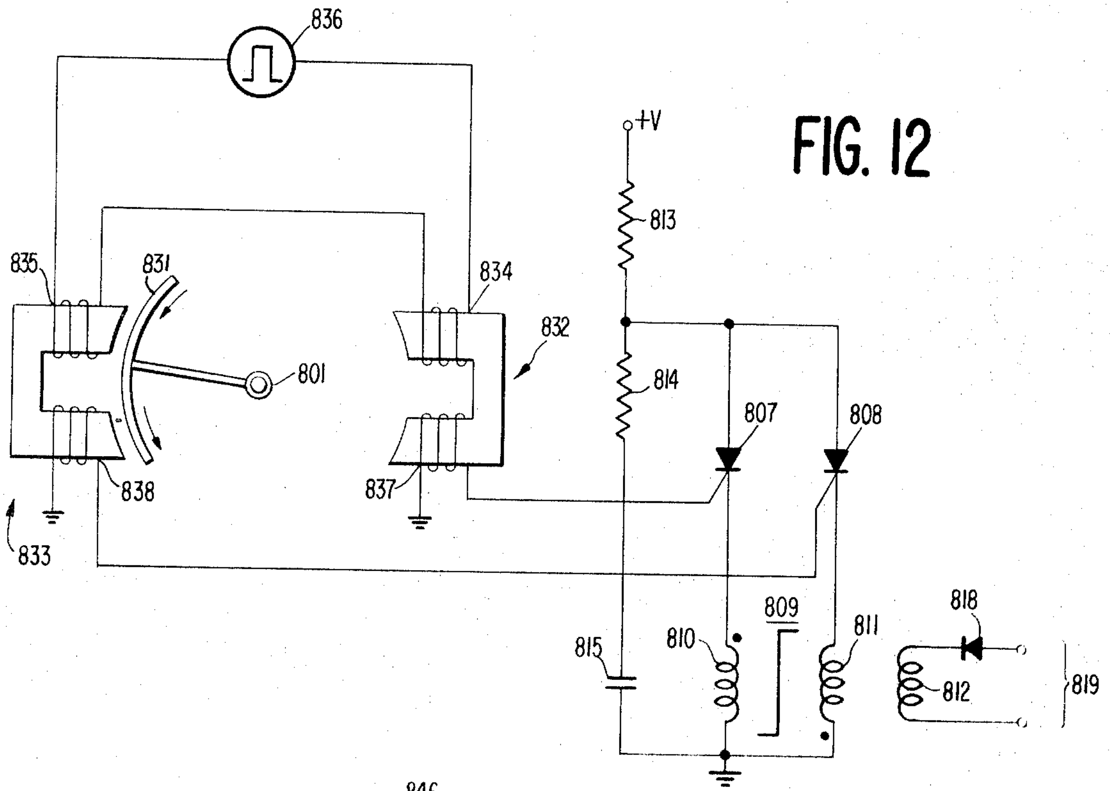
FIG. 12 illustrates an inductive shaft rotation sensor useful in the accumulator memory reply stations shown in FIGS. 4 and 7.

The circuit shown in FIG. 12 uses inductive coupling to sense the rotation of the shaft 801. In this embodiment, a vane of magnetic material 831 is mechanically coupled to the shaft 801. The vane 831 rotates in close proximity to the cores of pulse transformers 832 and 833 which are placed diametrically opposite one another on either side of the shaft 801. The pulse transformers 832 and 833 have first windings 834 and 835 which are connected in series to a pulse generator 836. The second or output winding 837 of transformer 832 is connected to the gate electrode of silicon controlled rectifier 807. The output winding 838 of transformer 833 is connected to the gate electrode of silicon controlled rectifier 808. As the vane 831 rotates past the core of transformer 832, for example, the pulses from pulse generator 836 are coupled through winding 834 to winding 837 and then to the gate electrode of silicon controlled rectifier 807. As the vane 831 continues to rotate, the inductive coupling ceases and pulses are no longer coupled to the gate electrode of silicon controlled rectifier 807. At a later time, the vane 831 is adjacent the core of pulse transformer 833. At this time, the pulses from pulse generator 836 are coupled through the winding 835 to winding 838 and thence to the gate electrode of silicon controlled rectifier 808. The operation of the remainder of the circuit is the same as that shown in FIG. 10.

Figure 13:
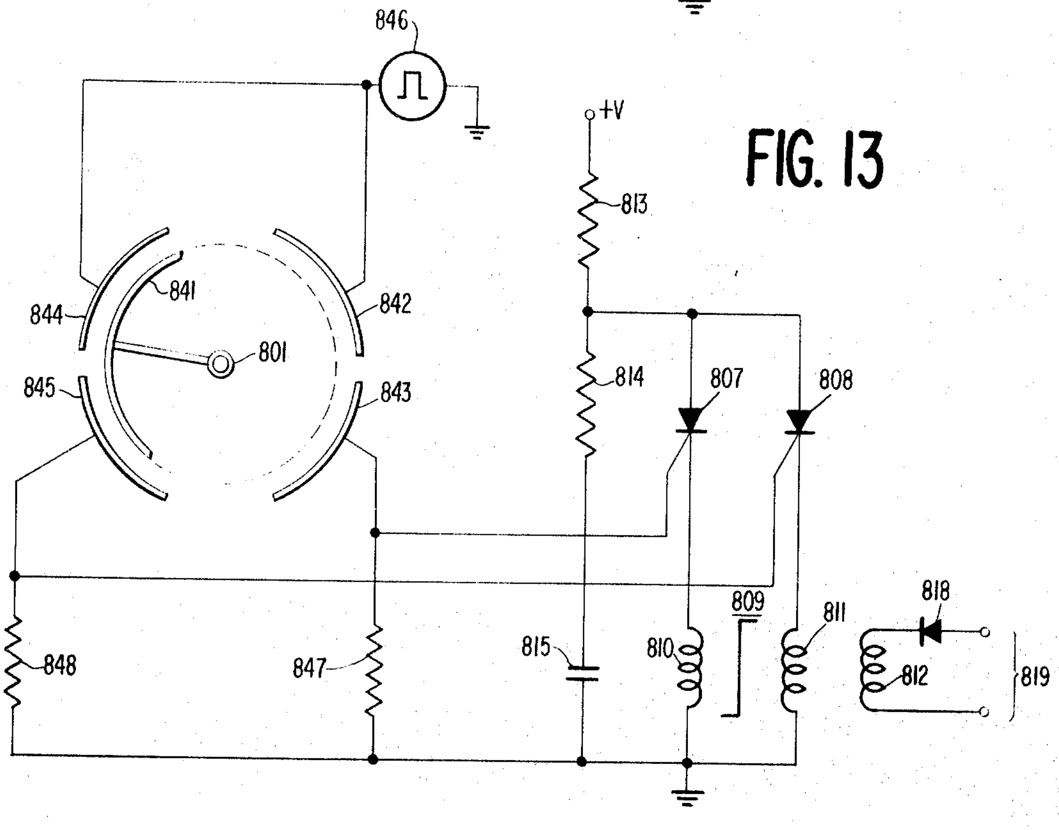
FIG. 13 illustrates a capacitive shaft rotation sensor useful in the accumulator memory reply stations illustrated in FIGS. 4 and 7.

In FIG. 13, a capacitive shaft rotation sensor is shown. Here, a vane of electrically conducting material 841 is mechanically linked to the meter shaft 801. Positioned about the periphery of the path described by the rotation of the vane 841 are four electrically conducting plates 842, 843, 844 and 845. The plates 842 and 844 are both connected to a pulse generator 846. The plate 843 is connected to a resistor 847 to ground, and the junction therebetween is connected to the gate electrode of silicon controlled rectifier 807. In a similar manner, the plate 845 is connected to a resistor 848 to ground, and the junction therebetween is connected to the gate electrode of silicon controlled rectifier 808. The revolving vane 841 and the plates 842, 843, 844 and 845 form two variable capacitors. For example, when the vane 841 is adjacent the plates 842 and 843, the output of the pulse generator 846 is capacitively coupled to the gate electrode of silicon controlled rectifier 807. As the shaft 801 rotates, the vane 841 ultimately becomes adjacent to plates 844 and 845 resulting in the pulses from generator 846 being capacitively coupled to the gate electrode of silicon controlled rectifier 808. The operation of the circuit of FIG. 13 is identical in all other respects to that described for FIG. 10.

Figure 14:
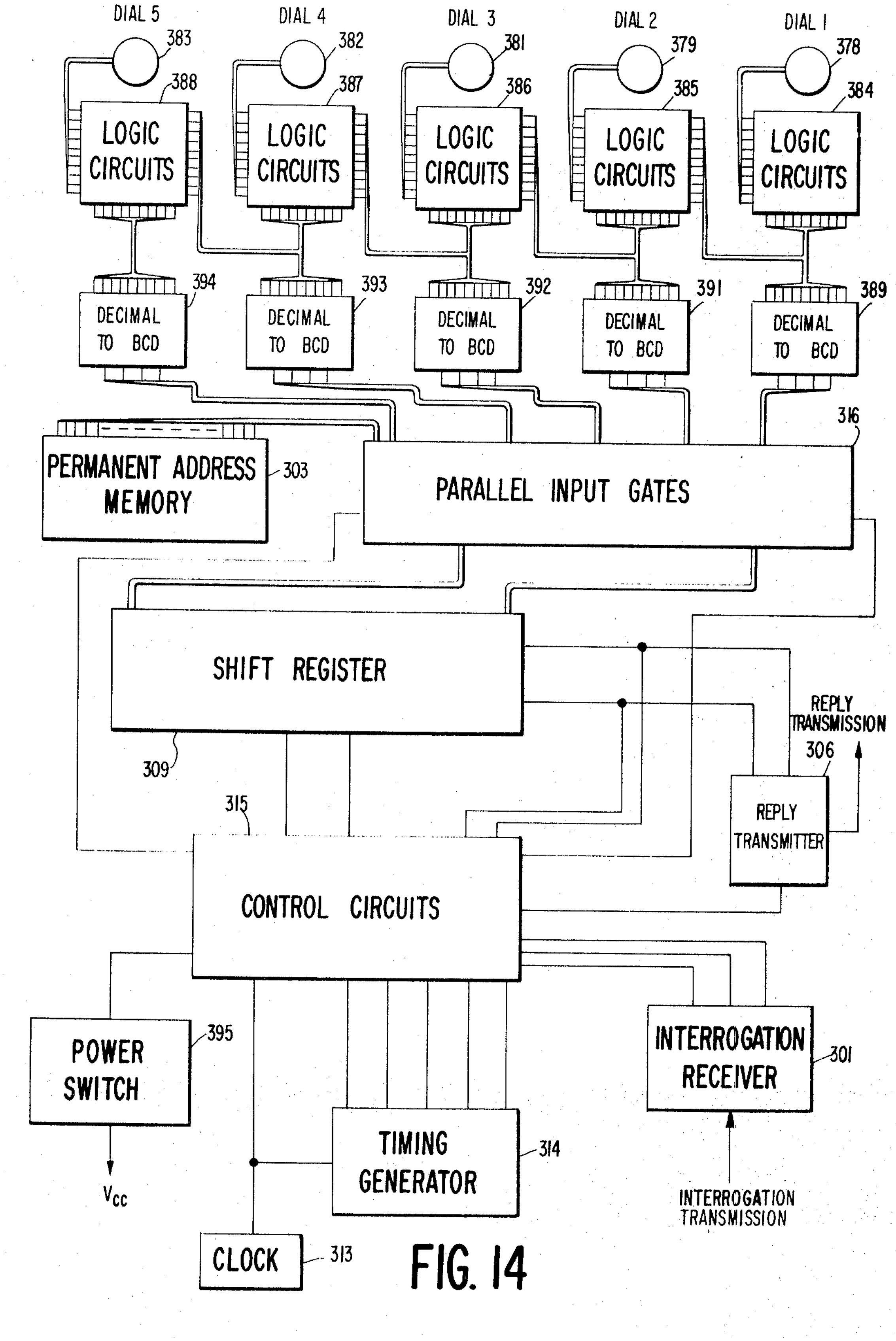
FIG. 14 is a detailed block diagram of a reply station using the mechanical memory of the utility meter.

Now referring to FIG. 14, there is shown a reply station which differs substantially from those shown in FIGS. 4 and 7 in that this station uses the mechanical memory of the utility meter. In this system, there are provided ten sensor elements on each utility meter register dial to furnish instantaneous meter reading outputs in digital form. Specifically, the first dial which would be the units dial is illustrated at 378. The remaining dials 379, 381, 382, and 383 correspond respectively to the tens, hundreds, thousands, and ten-thousand unit dials. Obviously, more or less dials would be used depending upon the nature of the particular utility meter. The 10 outputs from the sensors associated with each of the dials are fed to logic circuits which resolve any ambiguities in the sensor outputs. Thus, the 10 outputs from dial 378 are connected to the logic circuit 384, while the output from the remaining dials 379, 381, 382 and 383 are connected respectively to the logic circuits 385 to 388. The output of the logic circuits 384 through 388 is a unique decimal digit output for their associated dials 378, 379, 381, 382 and 383, respectively. These outputs are fed to decimal to binary-coded decimal encoding circuits 389, 391, 392, 393 and 394. A plurality of readout gates generally indicated at 316 are provided for parallel transfer of the binary coded decimal meter reading numbers into shift register 309. In addition, the readout gates 316 provide for the parallel transfer of the contents of the permanent address memory 303 to shift register 309. Control logic circuits 315 under the control of clock 313 and timing generator 314 control the operation of the system when an interrogation transmission is received by the interrogation receiver 301 and provide a reply by way of the reply transmitter 306 if the interrogation is a valid interrogation.

The sensor elements associated with each of the dials 378, 379, 381, 382 and 383 of the utility meter register together with their associated logic circuits 384 through 388 and the binary coded decimal encoding circuits 389, 391, 392, 393 and 394 are normally turned off when no meter reading reply is being transmitted. These circuits are turned on by a solid state power switch 395 which is activated during the reply transmission.

Each interrogation transmission begins with a preset pulse as was the case with the systems shown in FIGS. 4 and 7. This turns on the arming latch in the control logic 315 and presets the shift register 309 to zero. Immediately following the preset pulse, the first data pulse $f_0$ generates the readout pulse which transfers the assigned identification number from the address memory 303 into the shift register 309. During the remainder of the interrogation transmission, the contents of the shift register 309 and the outputs from the interrogation receiver 301 are synchronously fed into the address verification logic in the control circuit 315. As before, if any received pulse has a value which is different from the value of the corresponding stored address bit, the arming latch turns off, and no reply is sent.

During the reply interval, the first clock pulse generates a readout pulse which transfers the binary coded decimal outputs from the encoders 389, 391, 392, 393 and 394 to the shift register 309. Following this, the contents of the shift register are serially shifted into the reply transmitter 306, and the reply transmitter is keyed by the clock pulses from the clock 313. The modulation frequency of each transmitted reply pulse is $f_0$ or $f_1$, according to the configuration of the $m$-bit meter reading being shifted out of the shift register 309.

Figure 15B:
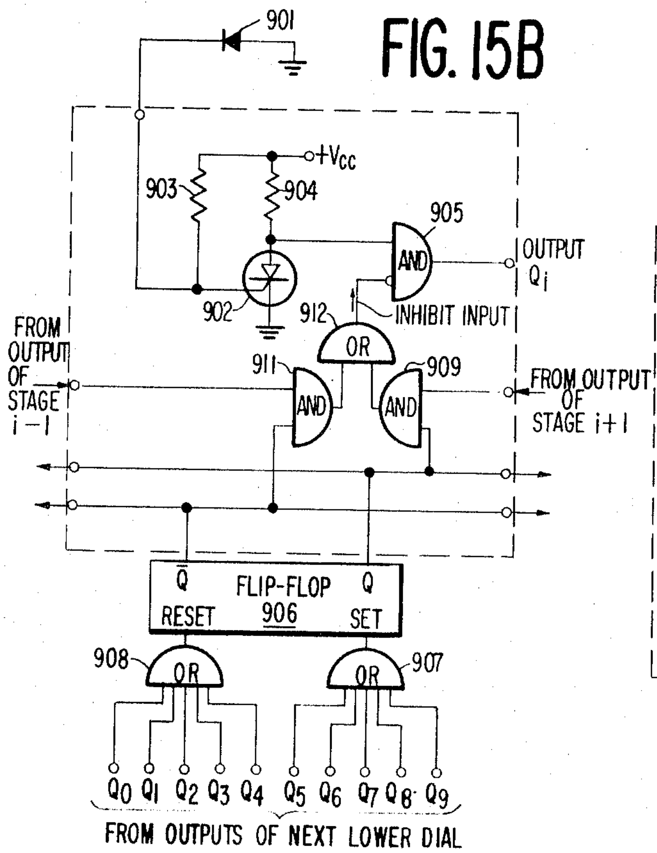
FIGS. 15A and B are the unique decimal digit logic diagrams for the reply station shown in FIG. 14.
Figure 15A:
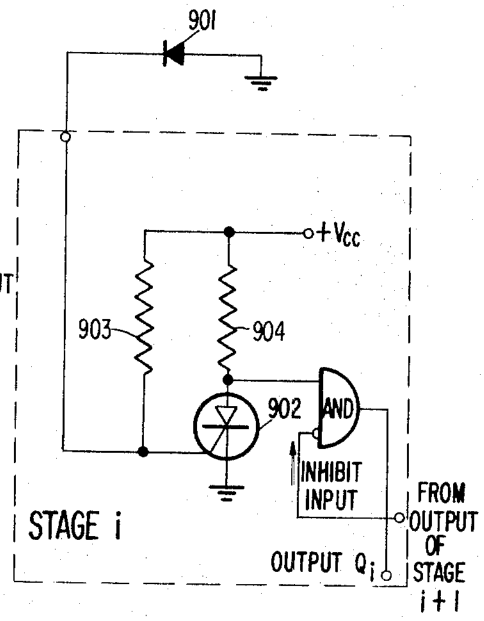

FIGS. 15A and B illustrate the unique decimal digit logic used in the logic circuits 384 through 388 of FIG. 14. Ten sensor elements on each register dial of the utility meter are arranged to give decimal digit outputs to indicate dial reading. Spacing between the sensor elements around a dial is 36°. The sensor exposure must exceed 36° of the arc so that there is no possibility that the dial shaft pointer would stop in between two sensor elements and have no output on any of the ten sensors. This results in two possible situations: (1) the unambiguous case where only one sensor is energized, and (2) the ambiguous case where two sensors are energized. The sensors themselves may be any of several suitable types, photodiodes being illustrated in FIGS. 15A and B. Of course, other types of sensors such as infrared, magnetic, capacitive, or purely mechanical may be used.

The logic circuits connected between the sensor elements on each registered dial resolve the ambiguity when two sensors are energized by selecting one of the digits for the output. For the units digit dial 378 of FIG. 14, the logic circuit simply selects the higher to two integers when two sensors are energized. This is shown in FIG. 15A where a photodiode 901 provides the output from dial 378 at the ith position, where $i$ is 0, 1, 2, 3, through 9. The output of photodiode 901 is connected to the gate electrode of silicon controlled rectifier 902 which is suitably biased by resistor 903. Silicon controlled rectifier 902 is connected between a source of positive potential plus $V_{CC}$ by way of resistor 904 and ground potential. The junction of silicon controlled rectifier 902 and resistor 904 is connected to one input of AND gate 905. The other input of AND gate 905 is an inhibit input from the next higher state of the dial. Thus, if two stages of the dial both provide an output such as, for example, stages 2 and 3, then there will be an output only at stage 3.

For all of the remaining register dials, the logic circuits must operate in either of two modes: (1) The logic circuit must select the lower of two integers if two sensors are energized. This mode is necessary whenever the output from the next lower dial is 5, 6, 7, 8 or 9. (2) The logic circuit must select the higher of two integers when two sensors are energized. This mode is necessary whenever the output from the next lower dial is 0, 1, 2, 3 or 4. Either one or the other of these two modes is selected by the flip-flop 906. To see how this happens, it may be seen that the circuitry 901 through 905 in FIG. 15B is the same as for FIG. 15A. The difference resides in the manner in which the inhibit input to AND gate 905 is generated. This is accomplished by providing an OR gate 907 which receives as its inputs the values 5, 6, 7, 8 and 9 from the next lower order dial. The output of OR gate 907 goes to one side of the flip-flop 906. A second OR gate 908 receives as its inputs the output 0, 1, 2, 3 and 4 from the next lower dial and provides its output to the other side of the flip-flop 906. The first output of flip-flop 906 enables an AND gate 909. AND gate 909 receives as its second input the next higher integer from the dial. The second output from flip-flop 906 enables an AND gate 911. The AND gate 911 has for its second input the next lower integer from the dial. The outputs from AND gates 909 and 911 are combined by OR gate 912 which controls the inhibit input to AND gate 905.

The silicon controlled rectifier switches 902 in each of the sensor logic circuits remain conducting after being triggered as long as the positive voltage plus $V_{CC}$ remains above the critical value. Thus, plus $V_{CC}$ must be turned off after each sampling operation in order to obtain a unique integer output for the next interrogation. All circuits are normally turned off between interrogations by the power switch 395 shown in FIG. 14. The circuits are then turned on again for each reply transmission by the power switch 395 which is activated by the reply latch in the control circuits 348.

Figure 16:
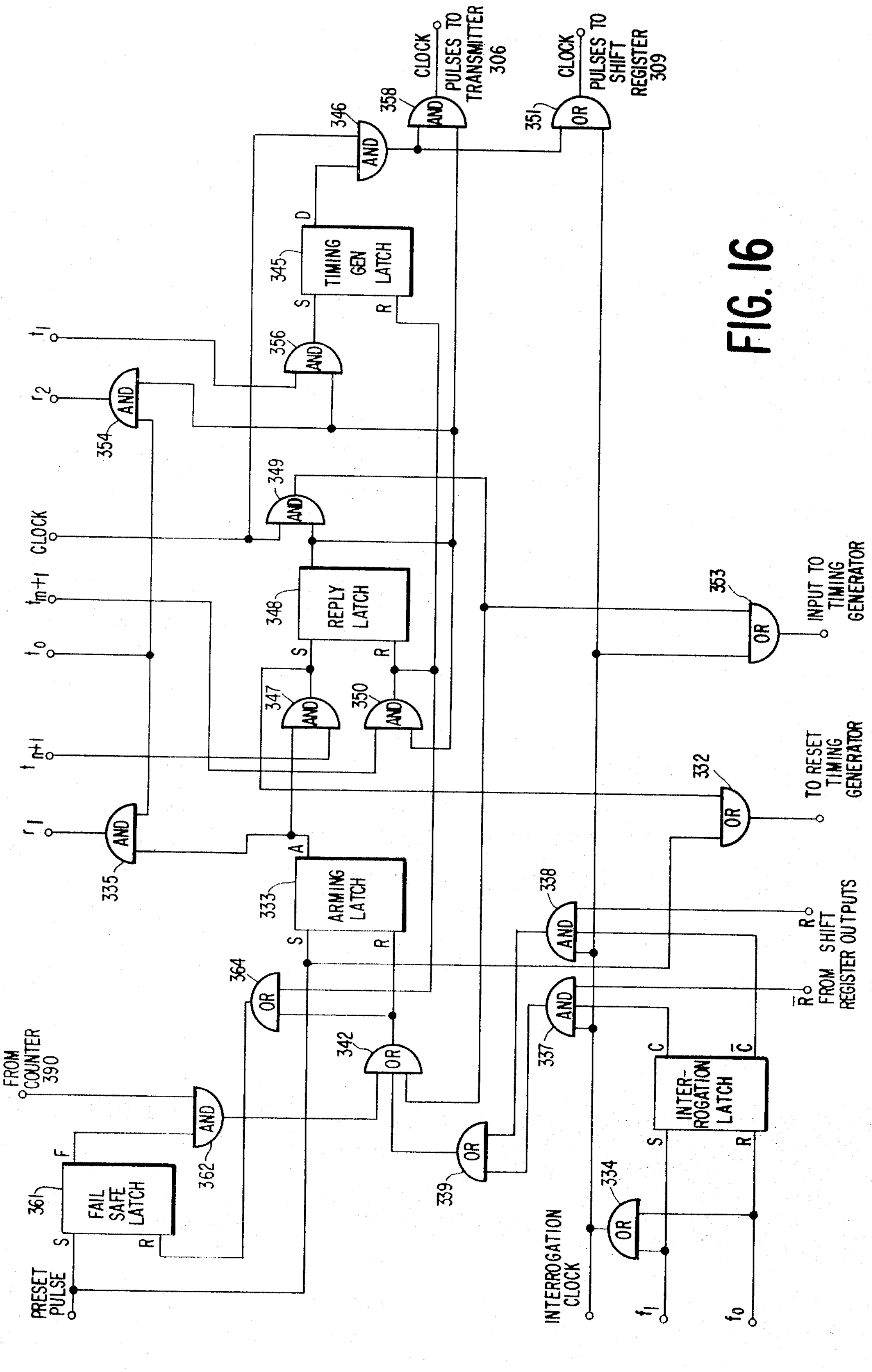
FIG. 16 is the control logic diagram for the reply station shown in FIG. 14.

FIG. 16 illustrates the control logic for the reply station shown in FIG. 14. The control logic shown in FIG. 16 is substantially the same as that shown in FIGS. 6 and 9. The control logic of FIG. 16 is like that shown in FIG. 9 in that the increment latch 365 of FIG. 6 is not required. The principle differences between the control logic of FIG. 16 and that of FIG. 9 is that the restore cycle is not required when the contents of the mechanical memory in the meter is read into the shift register 309. In addition, it is not necessary to provide an interconnection from the reply latch 348 with the mechanical memory as was done for the accumulating memory of the system shown in FIG. 7. The remaining logic is the same as that for FIG. 9 and the operation is the same. Thus, the logic of FIG. 16 provides for the interrogation reply cycle with verification and fail-safe functions.

Figure 17:
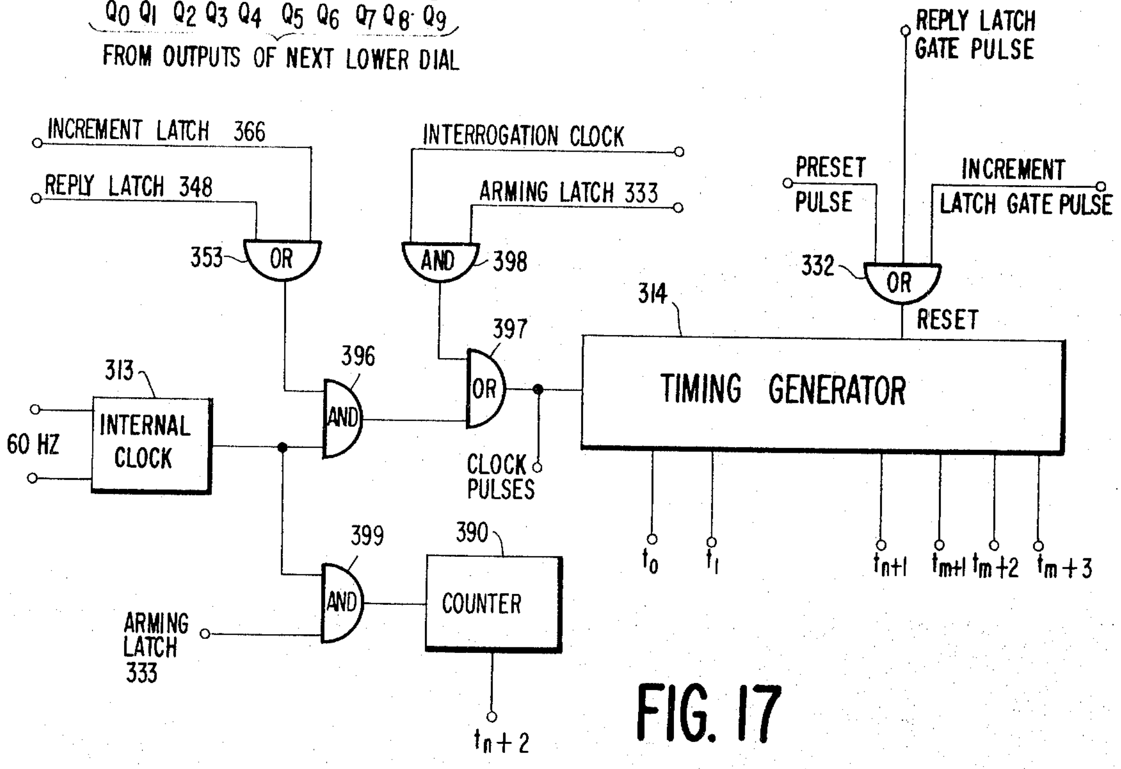
FIG. 17 illustrates a typical clock pulse and timing generator which may be used in any of the reply stations shown in FIGS. 4, 7 and 14.

The clock pulse generator and the timing generator for each of the reply stations shown in FIGS. 4, 7 and 14 are essentially the same. An exemplary clock pulse generator and timing generator is shown in FIG. 17. This comprises an internal clock 313 which is connected to a source of 60HZ signal which is obtained from the power line. The output of the internal clock 313 is connected to one input of an AND gate 396. The AND gate 396 is enabled by the output of OR gate 353 which has as its inputs the output of the reply latch 348 and the output of the increment latch 365 in the control logic 315. The output of AND gate 396 is passed by OR gate 397 to the counting input of the timing generator 314. The timing generator 314 is simply a counter which has output taps at predetermined points therealong. The other input of OR gate 397 is obtained from the output of AND gate 398 which has as its inputs an enabling input from the arming latch 333 of the control logic 315 and the interrogation clock also generated in the control logic by OR gate 334. Thus, it may be appreciated that the timing generator counts under the control of the internal clock 313 when either the reply latch 348 or the increment latch 365 is on. On the other hand, when the arming latch 333 is on, the timing generator 314 counts under the control of the interrogation clock. The system may be described then as being asynchronous with the interrogation and thereafter synchronous with the interrogation clock. The system, of course, is synchronous with its own internal clock 313 when either the reply latch 348 or the increment latch 365 is on.

The output of OR gate 397 also supplies the clock pulse input to the control logic 315 of the reply stations shown in FIGS. 4, 7 and 14. The timing generator 314 provides the output timing pulses $t_0$, $t_1$, $t_{n+1}$, $t_{m+1}$, $t_{m+2}$, $t_{m+3}$. Each of these pulses was described with respect to the control logic circuits shown in FIGS. 6, 9 and 16. The timing generator 314 is reset by the output of the OR gate 332. OR gate 332 has three inputs: the preset pulse, the reply latch gate pulse and the increment latch gate pulse. The output of the internal clock 313 is also coupled to one input of AND gate 399 which is enabled by the output of the arming latch 333 in the control logic 315. The output of AND gate 399 is connected to a counter 390 which provides an output after $t_{n+2}$ pulses have been counted. This output is supplied to the fail-safe logic circuitry to cause the arming latch 333 in the logic circuit to be reset should the interrogation be faulty or interrupted resulting in the arming latch 333 not being properly reset.

It will, of course, be appreciated that the circuit shown in FIG. 17 is for the general case where there is an increment latch 365. This, it will be remembered, applies to the system shown in FIG. 4. Obviously, in the system shown in FIGS. 7 and 14 there is no need for an increment latch because of the nature of the meter reading memory. As a result, the OR gate 353 would be eliminated and the output of the reply latch 348 would be connected directly to the input of AND gate 396. In a similar manner, the third input to OR gate 332 would be eliminated.

It will be apparent that the embodiments shown are only exemplary and that various modifications can be made in construction and arrangement within the scope of the invention as defined in the appendant claims.

I claim as my invention:

1. A remote automatic utility meter reading system comprising a. an interrogating source having an interrogation transmitting means for transmitting an address code corresponding to a particular utility meter to be interrogated, and a reply receiving means for receiving the reply transmission from a utility meter being interrogated, b. a plurality of reply stations each having an interrogation receiving means for receiving an interrogation transmission from said interrogation transmitting means, a meter address identification memory, authenticating means for comparing the contents of the meter identification memory with the encoded interrogation transmission from said interrogating source, a meter reading memory, and reply transmitting means connected to said meter reading memory and enabled by said authenticating means for transmitting the meter reading if the interrogation was a valid interrogation, and c. a communication link interconnecting said interrogation source with said plurality of reply stations, d. wherein said communication link is a combination of an electric power line and wireless communication link.

2. The meter reading system according to claim 1 wherein the interrogating source is mobile.

3. A remote, automatic utility meter reading system comprising:

a. an interrogating source having an interrogation transmitting means for transmitting an address code corresponding to a particular utility meter to be interrogated, and a reply receiving means for receiving the reply transmission from a utility meter being interrogated, b. a plurality of reply stations each having an interrogation receiving means for receiving an interrogation transmission from said interrogation transmitting means, a meter address identification memory, authenticating means for comparing the contents of the meter identification memory with the encoded interrogation transmission from said interrogating source, a meter reading memory, and reply transmitting means connected to said meter reading memory and enabled by said authenticating means for transmitting the meter reading if the interrogation was a valid interrogation, and c. a communication link interconnecting said interrogation source with said plurality of reply stations, wherein said interrogating source is at a fixed location and wherein said communication link is an electric power line with wireless bypasses around power transformers and other obstructions.

4. The meter reading system according to claim 1 wherein the wireless link is a radio frequency link.

5. The utility meter reading system according to claim 1 wherein the wireless communication link is an acoustic communication link.

6. The utility meter reading system according to claim 1 wherein the interrogating source is at a fixed location.

7. The utility meter reading system according to claim 3 wherein the wireless bypass is a radio frequency bypass.

8. The utility meter reading system according to claim 3 wherein the wireless bypass is an acoustic bypass.

9. The utility meter reading system according to claim 3 wherein the transmission by said interrogation transmitting means is a pulse frequency modulated transmission and includes a preset pulse, a first data pulse corresponding to a binary ONE, and a second data pulse corresponding to a binary ZERO, and wherein the reply transmission by said reply transmitting means is a pulse frequency modulated transmission including said first and second data pulses.

10. The utility meter reading system according to claim 9 wherein said preset pulse is a first pulse modulated frequency, said first data pulse is a second pulse modulated frequency, and said second data pulse is a third pulse modulated frequency.

11. The utility meter reading system according to claim 9 wherein said first data pulse is a first pulse modulated frequency, said second data pulse is a second pulse modulated frequency, and said preset pulse is the simultaneous transmission of pulses at both data frequencies.

12. The utility meter reading system according to claim 9 wherein said meter identification memory is a read only non-volatile memory.

13. The utility meter reading system according to claim 10 further including a shift register at said reply station into which the contents of said meter identification memory is transferred for authenticating the interrogation transmission.

14. The utility meter reading system according to claim 13 wherein said authenticating circuits comprise comparing means to compare the output of said receiving means and said shift register.

15. The utility meter reading system according to claim 14 wherein said authenticating circuits further include an arming latch which is set by said preset pulse and rest by said comparing means if the output of said receiving means does not agree with the output of said shift register.

16. The utility meter reading system according to claim 15 further including gating means enabled by said arming latch if the interrogation is valid to transfer the contents of said meter reading memory to said reply transmitter.

17. The utility meter reading system according to claim 12 further including gate means enabled by said authenticating circuit if a valid interrogation has been received to transfer the contents of said meter reading memory to said reply transmitter.

18. The utility meter reading system according to claim 17 wherein said meter reading memory is an accumulating memory, and the utility meter is provided with a pulse generating means to produce pulses which are accumulated in said meter reading memory.

19. The utility meter reading system according to claim 18 wherein said pulse generating means includes sensor means coupled to the utility meter shaft to produce a pulse each revolution of the meter shaft.

20. The utility meter reading system according to claim 19 wherein said sensor is a commutating mechanical switch.

21. The utility meter reading system according to claim 19 wherein said sensor is a photoelectric switch.

22. The utility meter reading system according to claim 19 wherein said sensor is an inductively coupled switch.

23. The utility meter reading system according to claim 17 wherein said sensor is a capacitive coupled switch.

24. The utility meter reading system according to claim 18 further including a special purpose digital computing means coupled to said pulse generating means to add one to the contents of said meter reading memory each time said pulse generating means produces an output pulse.

25. The meter reading system according to claim 18 wherein said meter reading memory is a counting memory which is coupled to said pulse generating means and automatically increases its contents by one each time said pulse generating means produces an output pulse.

26. The utility meter reading system according to claim 17 wherein said meter reading memory is the mechanical memory of said utility meter.

27. The utility meter reading system according to claim 26 further including sensor means to provide a decimal output for each dial of the mechanical memory of said utility meter.

28. The utility meter reading system according to claim 27 further including logic means coupled to said sensor means to resolve ambiguities between adjacent outputs of each of said dials.

29. The utility meter reading system according to claim 9 wherein said identification memory is a non-volatile read-only memory and further comprising shift register means, and an arming latch means, said arming latch being set by said preset pulse to transfer the contents of said identification memory to said shift register means, said authenticating means being connected to said shift register means for comparing the output of said shift register with the received interrogation transmission, and said meter reading memory being connected to said shift register means to have its contents transferred into said shift register means if the interrogation is valid, and said shift register then being operable to transfer its contents to said reply transmitting means.

30. The utility meter reading system according to claim 29 further including fail-safe means connected to said arming latch means to reset said arming latch means in the event that the interrogation transmission is faulty or has been interrupted.

31. The utility meter reading system according to claim 29 further comprising a reply latch means enabled by said arming latch means when the interrogation is valid to reset said arming latch means and to cause the contents of said meter reading memory to be transferred to said shift register means for transfer to said reply transmitting means.

32. The utility meter reading system according to claim 31 further comprising means to reset said reply latch means after the contents of said shift register means have been transmitted by said reply transmitting means.

* * * * *